(12) United States Patent
Garhart et al.

(10) Patent No.: US 10,824,683 B2
(45) Date of Patent: Nov. 3, 2020

(54) SEARCH ENGINE

(71) Applicant: INTERNATIONAL BUSINESS MACHINES CORPORATION, Armonk, NY (US)

(72) Inventors: Priscilla M. Garhart, Madison, WI (US); Douglas L. Lieberman, Northbrook, IL (US); Sandra L. Steinruck, Fort Pierce, FL (US); Richard C. Yarn, Seminole, FL (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 495 days.

(21) Appl. No.: 15/491,005

(22) Filed: Apr. 19, 2017

(65) Prior Publication Data

US 2018/0307755 A1 Oct. 25, 2018

(51) Int. Cl.
*G06F 16/951* (2019.01)
*G06F 16/248* (2019.01)
*G06F 16/2457* (2019.01)
*G06N 5/04* (2006.01)
*G06Q 10/10* (2012.01)
*G06Q 10/06* (2012.01)

(52) U.S. Cl.
CPC .......... *G06F 16/951* (2019.01); *G06F 16/248* (2019.01); *G06F 16/24575* (2019.01); *G06Q 10/0637* (2013.01); *G06Q 10/10* (2013.01); *G06N 5/04* (2013.01)

(58) Field of Classification Search
CPC ............. G06F 16/24575; G06F 16/248; G06F 16/951; G06F 17/30864; G06F 17/30528; G06F 17/30554; G09B 19/18; G06Q 10/10; G06Q 10/0637; G06N 5/04
See application file for complete search history.

(56) References Cited

U.S. PATENT DOCUMENTS

| | | | |
|---|---|---|---|
| 5,224,206 A | 6/1993 | Simoudis | |
| 5,243,689 A * | 9/1993 | Yoshiura | G06N 5/04 706/12 |
| 5,995,956 A * | 11/1999 | Nguyen | G06N 5/022 706/54 |
| 6,336,110 B1 * | 1/2002 | Tamura | G06N 5/003 706/46 |
| 7,050,977 B1 * | 5/2006 | Bennett | G06F 17/2775 704/270.1 |
| 7,730,009 B1 * | 6/2010 | Higgins | G06N 5/02 706/50 |

(Continued)

FOREIGN PATENT DOCUMENTS

WO 0188848 11/2001

*Primary Examiner* — James E Richardson
(74) *Attorney, Agent, or Firm* — F. Chau & Associates, LLC (57) ABSTRACT

In a method of searching for cases, a list of topics is presented by a computer for selection of one of the topics by a user. The one selected topic relates to a first object and is associated with a goal. At least one second object is determined by the computer. The at least one second object differs from the first object but includes a same attribute as the first object. The computer searches for cases that teach solutions for achieving the goal for the at least one second object. Cases that resulted from the searching are presented by the computer to the user.

16 Claims, 9 Drawing Sheets

(56) References Cited

U.S. PATENT DOCUMENTS

| | | | |
|---|---|---|---|
| 7,769,615 B2 | 8/2010 | Linder et al. | |
| 2002/0007373 A1* | 1/2002 | Blair | G06F 16/34 |
| | | | 715/223 |
| 2002/0111817 A1* | 8/2002 | Cronin | G06Q 10/10 |
| | | | 705/310 |
| 2008/0091727 A1* | 4/2008 | Wynett | G06N 5/04 |
| 2011/0055699 A1* | 3/2011 | Li | G06F 16/951 |
| | | | 715/709 |
| 2011/0153539 A1* | 6/2011 | Rojahn | G06F 16/367 |
| | | | 706/50 |
| 2014/0089287 A1* | 3/2014 | Connolly | G06F 16/9038 |
| | | | 707/707 |
| 2014/0195463 A1* | 7/2014 | Jacobs | G06N 5/00 |
| | | | 706/11 |
| 2016/0142338 A1* | 5/2016 | Steinder | H04L 41/0813 |
| | | | 709/226 |
| 2016/0170989 A1* | 6/2016 | Bishop | G06F 16/24578 |
| | | | 707/723 |

\* cited by examiner

FIG. 10

SEARCH ENGINE

TECHNICAL FIELD

Exemplary embodiments of the inventive concept relate to a search engine for searching cases.

DISCUSSION OF RELATED ART

Many different types of search engines exist. General Internet search engines can search for nearly anything by inputting a plurality of keywords. Some search engines are able to accept input in natural language form. Certain search engines are more specialized, e.g., only searching law or business cases or providing calculations/computations in response to questions.

Search engines may be used in, for example, case studies or business training courses. In a traditional case study, learners may search for and study a single case about a business and how it achieved or failed to achieve a goal. For example, a case may be about how a company successfully doubled its sales or how another company failed to start a viral marketing campaign. On the other hand, a case may be more technically oriented, e.g., how an engine was developed with superior fuel efficiency while maintaining relatively high horsepower.

Regardless, the learners may typically study only one case at a time, e.g., clicking one case at a time. Using the knowledge gained from these cases, the learners may apply existing techniques or solutions towards problems encountered in their own businesses. Alternatively, the learners may have a goal in mind, and may search for and study cases in an attempt to find a way to achieve the goal.

However, with the traditional case study, learners may be more inclined to select cases within the same field, technology, industry, business unit, etc. Accordingly, learners may tend to apply existing solutions (possibly with some modification) to achieve their goals. Furthermore, learners do not gain practical experience in devising new solutions when using the traditional case study. As a tool for searching for cases, most search engines are limited in how cases are searched and lack additional functionality to view and combine parts of different cases of varying relevancy.

SUMMARY

According to an exemplary embodiment of the inventive concept, in a method of searching for cases, a list of topics is presented by a computer for selection of one of the topics by a user. The one selected topic relates to a first object and is associated with a goal. At least one second object, from among the listed cases, is determined by the computer. The at least one second object differs from the first object but includes a same attribute as the first object. The computer searches for cases that teach solutions for achieving the goal for the at least one second object. The cases that resulted from the searching are presented by the computer to the user.

According to an exemplary embodiment of the inventive concept, a search engine for searching for cases includes a memory configured to store a computer program, a processor configured to execute the computer program, and a display device. The computer program is configured to: present a list of topics on a user interface of the display device for selection of one of the topics by a user where the one selected topic relates to a first object and is associated with a goal; determine at least one second object, from among the listed cases, that differs from the first object but includes a same attribute as the first object; search for cases that teach solutions for achieving the goal for the at least one second object; and present the cases on the user interface that resulted from the search.

According to an exemplary embodiment of the inventive concept, in a computer program product to search for cases, the computer program product including a computer readable storage medium having program instructions embodied therewith, the program instructions are executable by a computer to perform a method. The method includes presenting a list of topics for selection of one of the topics by a user where the one selected topic relates to a first object and is associated with a goal, determining at least one second object that differs from the first object but includes a same attribute as the first object, searching for cases that teach solutions for achieving the goal for the at least one second object, and presenting the cases that resulted from the searching to the user.

BRIEF DESCRIPTION OF THE DRAWINGS

The above and other features of the inventive concept will become more apparent by describing in detail exemplary embodiments thereof, with reference to the attached drawings.

DETAILED DESCRIPTION OF THE EMBODIMENTS

Exemplary embodiments of the inventive concept will be described more fully hereinafter with reference to the accompanying drawings. Like reference numerals may refer to like elements throughout the specification and drawings.

Exemplary embodiments of the inventive concept provide a search engine for searching cases. In a training course, learners may use the search engine in an innovation-oriented case study method to assist in developing new and innovative solutions and allowing learners to gain practical experience in thinking innovatively. This search engine may be used in a standalone course to solve a particular business problem or may be a tool in an overall course. For example, in a course on server maintenance, the search engine may be used to work on improving different aspects of server maintenance.

Figure 1:
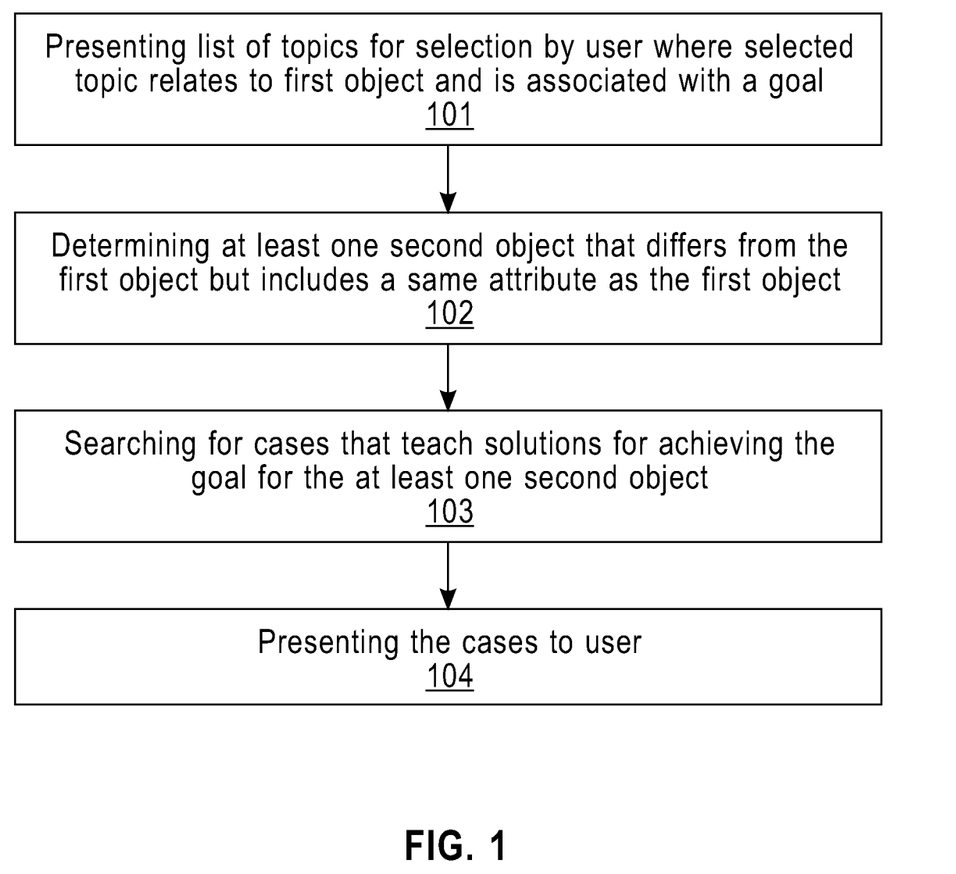
FIG. 1 is a flowchart illustrating a method of searching for cases according to an exemplary embodiment of the inventive concept.

FIG. 1 is a flowchart illustrating a method of searching for cases according to an exemplary embodiment of the inventive concept.

Referring to FIG. 1, a computer presents a list of topics for selection of one of the topics by a user (operation 101). The one selected topic relates to a first object and is associated with a goal. For example, in a training course, the user may be presented with a task of achieving the goal for the first object. The goal may be to solve a business, technical, or management problem. As one of many possible examples, the first object may be a motorboat and the goal may be to improve the motorboat. To design a better motorboat, the goal may be broken into mores specific components such as reducing drag, increasing engine power, reducing engine weight, improving navigation support, etc. Accordingly, several possible topics could be motorboat engines, vehicle navigation, manufacturing materials, etc.

As another example, the first object may be a retail apparel company and the goal may be to increase profits. Alternatively, the first object may be a business training course and the goal may be to more effectively teach sales skills or improving employee engagement. In other words, there may be a wide variety of first objects and goals, and accordingly, a wide variety of related topics.

According to an exemplary embodiment of the inventive concept, the topics are broken down into categories and sub-categories. The computer may use an algorithm to provide a predefined list of categories and sub-categories. For example, the categories may include human resources, sales, offering analysis, security, engines, etc. The sub-categories may include changing employee behavior, technical skills, interpersonal skills, different aspects of an engine (e.g., weight, displacement), etc. In other words, there may be a wide range of categories and sub-categories, and the topic may correspond to at least one category and sub-category. According to an exemplary embodiment of the inventive concept, the user selects at least one category and at least one sub-category as the topic related to the goal for the first object. The categories and sub-categories may be stored in a database and may be used to narrow or refine a subsequent search for cases.

At least one second object is determined by the computer (operation 102). The at least one second object differs from the first object but includes a same attribute as the first object. The same or shared attributes or elements may be identified with the assistance of cognitive technology or artificial intelligence. For example, if the first object is the motorboat described above, the at least one second object may include a submarine, a motorcycle, an automobile, etc. (e.g., the same attribute being transportation capabilities).

According to an exemplary embodiment of the inventive concept, the at least one second object is determined by the user. This may be performed by inputting the at least one second object into a user interface provided on the computer. For example, the user already may have in mind objects that are similar or analogous to the first object. According to an exemplary embodiment of the inventive concept, both the computer and the user determine the at least one second object.

The computer searches for cases that teach solutions for achieving the goal for the at least one second object (operation 103). The cases may be real-world cases retrieved from the Internet, a database, etc., and may be business cases, technical cases, etc. If there are two or more second objects, the computer searches for cases for each of the second objects.

The cases that resulted from the searching are presented by the computer to the user (operation 104).

The cases that resulted from the searching contain solutions for achieving the goal for the at least one second object. For example, if the first object is the motorboat and the goal is to improve the motorboat as described above, solutions in the cases may relate to improving similar objects, such as how airfoils or submarines deal with air or water resistance to reduce drag, how motorcycle engines are designed to increase power while reducing weight, how automobiles use a global positioning system (GPS) to provide lightweight but accurate navigation, etc. Any of these may potentially be applied to achieve the goal of improving the motorboat.

According to an exemplary embodiment of the inventive concept, cognitive technology is used to search for the cases that teach solutions for achieving the goal for the at least one second object.

According to an exemplary embodiment of the inventive concept, the user interface allows the user to highlight different objects or cases to visually mark and arrange them. The user may also be able to take notes using the user interface.

Figure 2:
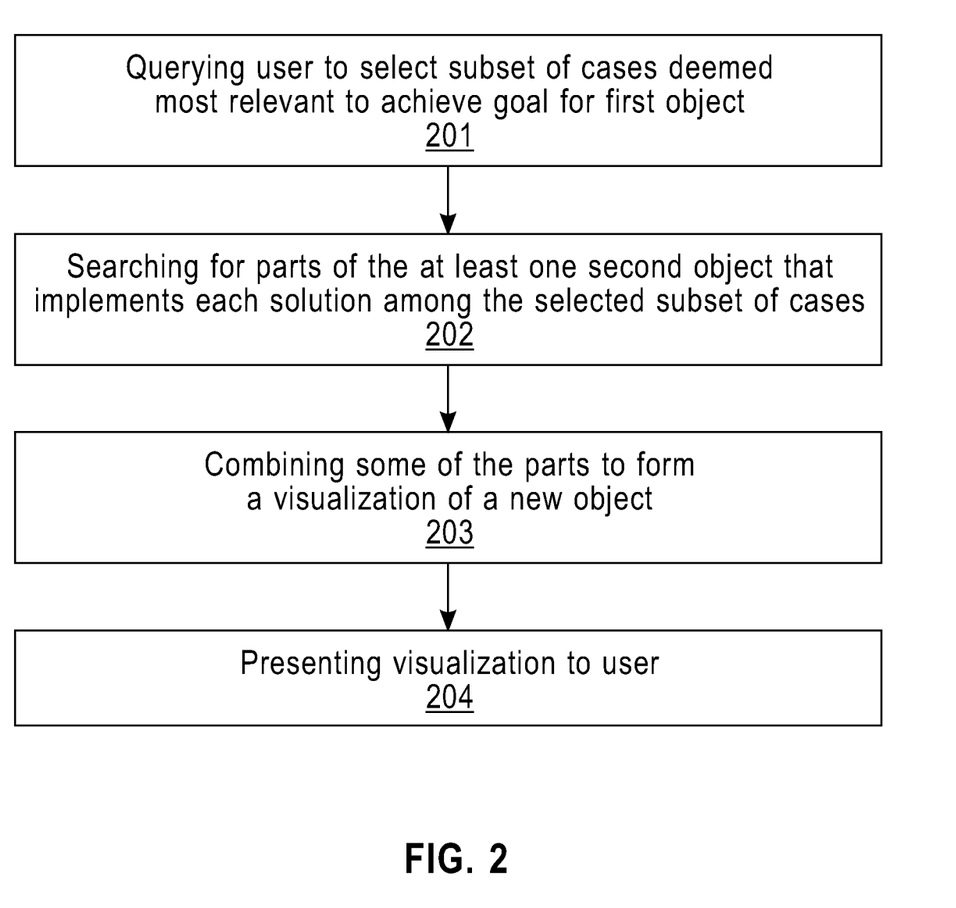
FIG. 2 is a flowchart illustrating additional operations of the method of FIG. 1 according to an exemplary embodiment of the inventive concept.

FIG. 2 is a flowchart illustrating additional operations of the method of FIG. 1 according to an exemplary embodiment of the inventive concept.

Referring to FIG. 2, the user is queried to select a subset of the cases the user deems to be most relevant to achieving the goal for the first object (operation 201). As the at least one second object is only partly related to the first object, not all solutions presented to the user may be viable, practical, cost-effective, etc.

The Internet is searched for parts of the at least one second object that implements each solution among the selected subset of cases (operation 202). In other words, the at least one second object may broken down into component parts and a further search may be conducted to find different solutions for each part.

According to an exemplary embodiment of the inventive concept, the searching is performed by an automated question answering computer capable of answering questions posed in natural language. For example, the automated question answering computer may ask the user questions in natural language to determine the target of the search.

Some of the parts are combined to form a visualization of a new object (operation 203). For example, cognitive technology or artificial intelligence may be used to create possible combinations or connections between some of the parts. For example, there may be more than one second object and parts from different second objects may be combined. According to an exemplary embodiment of the inventive concept, the combining is performed randomly.

The visualization is presented to the user (operation 204). Accordingly, the user may be able to identify viable, innovative solutions from the visualization to achieve the goal for the first object.

Figure 3A:
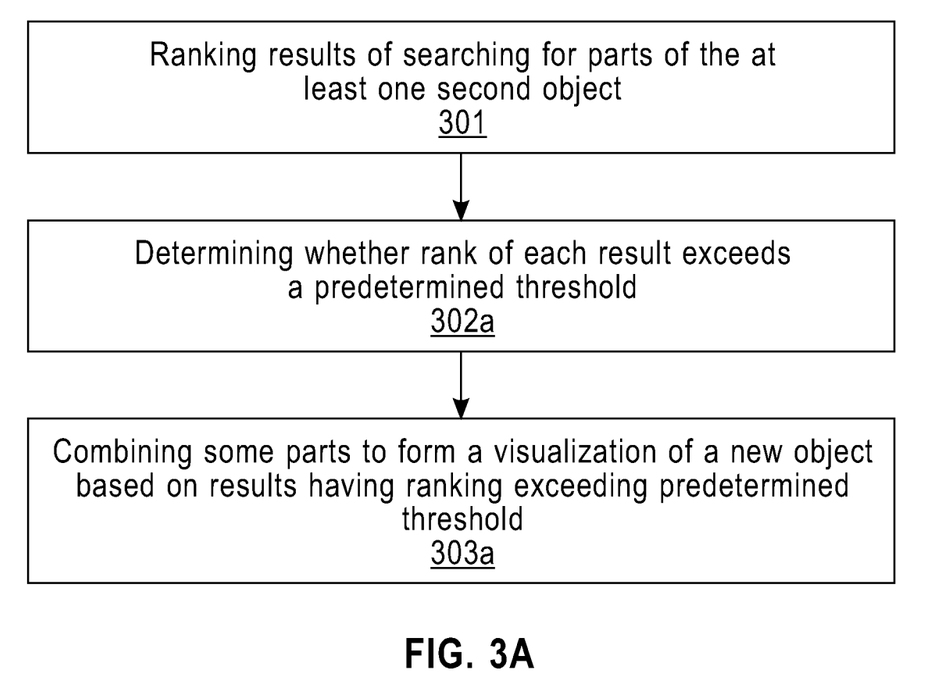
FIGS. 3A and 3B are flowcharts illustrating operations to rank search results of the method of FIG. 1 according to exemplary embodiments of the inventive concept.
Figure 3B:
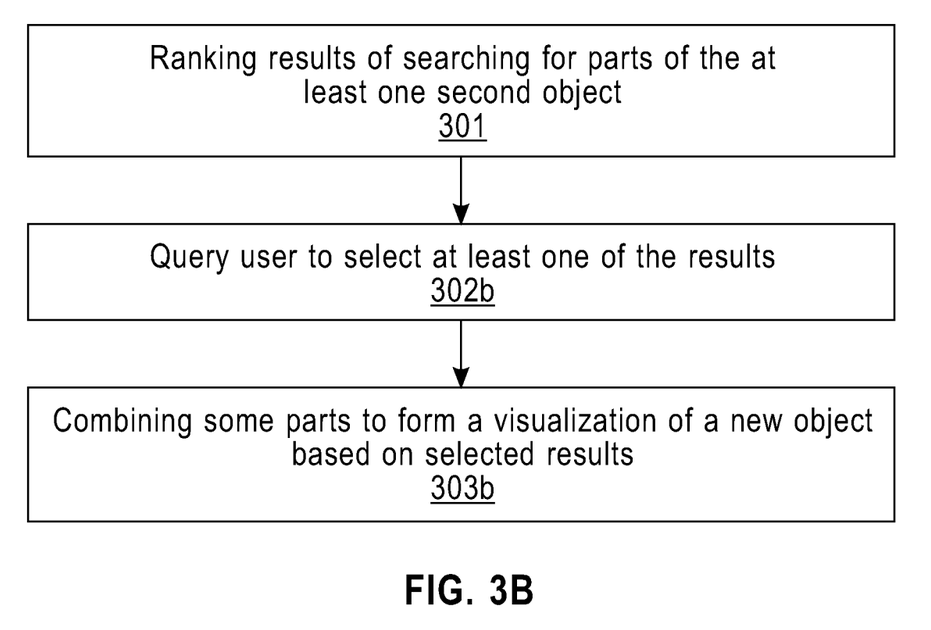

FIGS. 3A and 3B are flowcharts illustrating operations to rank search results of the method of FIG. 1 according to exemplary embodiments of the inventive concept.

Referring to FIG. 3A, the automated question answering computer, as described with reference to FIG. 2, ranks the results of searching for parts of the at least one second object (operation 301). The ranking may be performed according to a confidence algorithm. For example, operation 301 may be performed after operation 202 of FIG. 2.

According to an exemplary embodiment of the inventive concept, the automated question answering computer ranks the results of searching for the cases (e.g., operation 103 of FIG. 1).

It is determined whether the rank of each of the results exceeds a predetermined threshold (operation 302a). The predetermined threshold may be set by the user.

The combining is performed based on the results having a ranking exceeding the predetermined threshold (operation 303a). As such, less relevant results may be excluded from the combining. Operation 303a corresponds to operation 203 of FIG. 2.

Referring to FIG. 3B, similar to FIG. 3A, the automated question answering computer, as described with reference to FIG. 2, ranks the results of searching for parts of the at least one second object (operation 301).

The user is queried to select at least one of the results (operation 302b). In other words, the user may determine which of the results should be used for combining.

The combining is performed based on the selected results (operation 303b). Operation 303b corresponds to operation 203 of FIG. 2.

According to an exemplary embodiment of the inventive concept, after combining based on results having a ranking exceeding the predetermined threshold (e.g., operation 303a), the user may manually modify the combinations using different parts.

Figure 4:
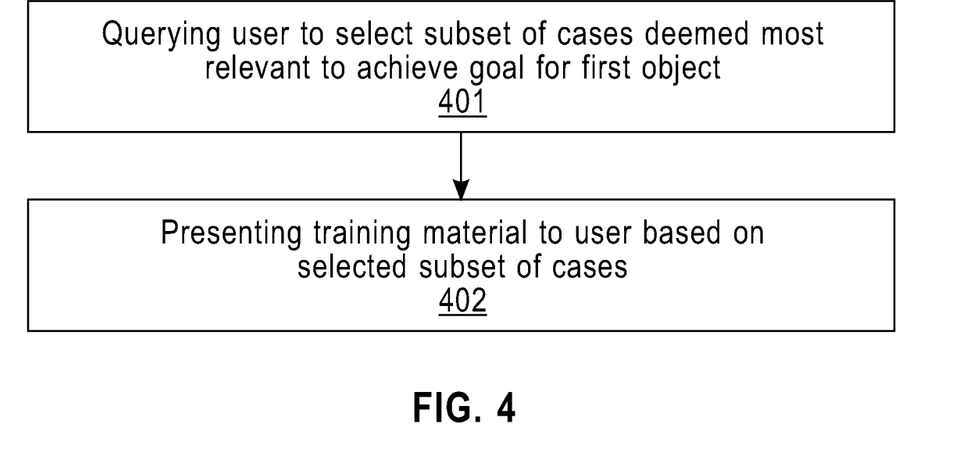
FIG. 4 is a flowchart illustrating additional operations of the method of FIG. 1 according to an exemplary embodiment of the inventive concept.

FIG. 4 is a flowchart illustrating additional operations of the method of FIG. 1 according to an exemplary embodiment of the inventive concept.

The user is queried to select a subset of the cases the user deems to be most relevant to achieving the goal for the first object (operation 401). Operation 401 may be substantially the same as operation 201 of FIG. 2.

Training material is presented to the user based on the selected subset of cases (operation 402). Training material may be additional or related information with regards to the selected subset of cases.

According to an exemplary embodiment of the inventive concept, the training material is a uniform resource locator (URL). In other words, the computer may conduct a search on the Internet for more information on the selected subset of cases and present the training material as a list of URLs to the user. According to an exemplary embodiment of the inventive concept, the user is able to select parts from the training material to add to the combinations (e.g., as described with reference to FIGS. 3A and 3B).

According to an exemplary embodiment of the inventive concept, operations described with reference to FIGS. 1 to 4 are implemented as a search engine and embodied as program instructions executable by a processor in a computer. The program instructions may be stored in a computer readable storage medium of a computer program product. For example, the computer program product may be stored in a memory of the computer. A display device of the computer may be configured to display the user interface for the search engine to perform the operations described with reference to FIGS. 1 to 4. For example, the user interface may present the list of topics for selection by the user (e.g., operation 101 of FIG. 1). This configuration will be described further below with reference to FIGS. 5 and 10.

Figure 5:
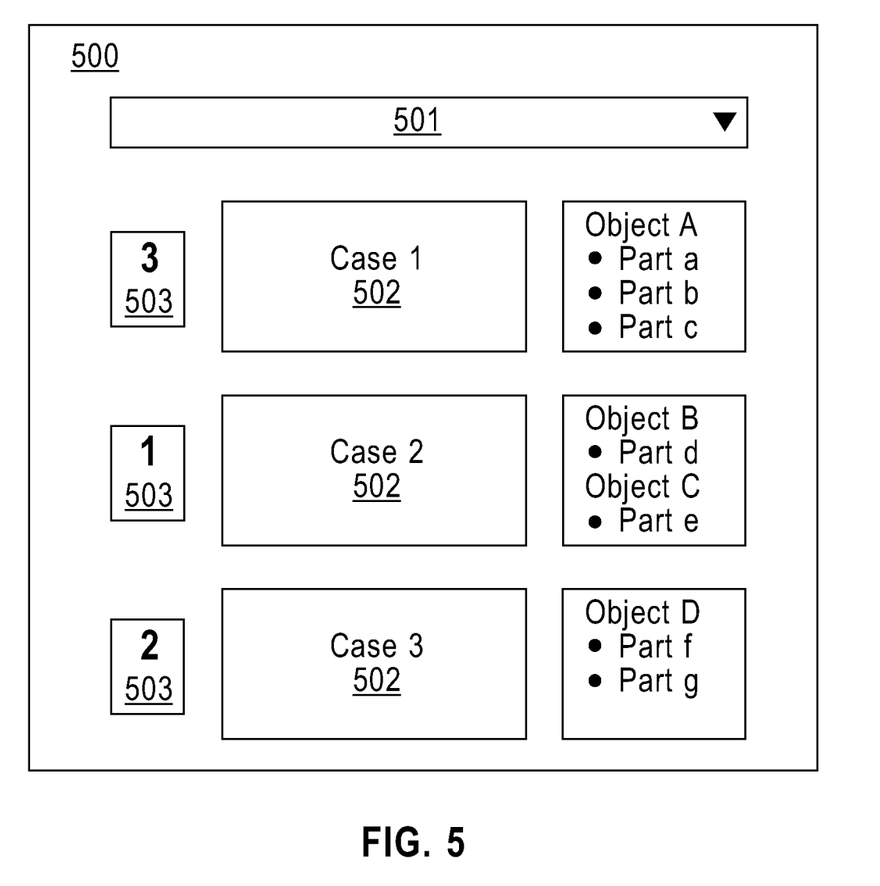
FIG. 5 illustrates an example of a user interface of a search engine according to an exemplary embodiment of the inventive concept.

FIG. 5 illustrates an example of a user interface of a search engine according to an exemplary embodiment of the inventive concept.

As described above, operations of FIGS. 1 to 4 are implemented as a search engine according to an exemplary embodiment of the inventive concept. The search engine may include a user interface 500. The user interface 500 may display an input box 501 for accepting input from the user.

The input box 501 may be a drop-down list and the user may select one of the listed topics using the first input box 501 (e.g., operation 101 of FIG. 1).

According to an exemplary embodiment of the inventive concept, the search engine may be configured to accept and parse entries in natural language. For example, the user may enter a desired topic in natural language in the input box 501 and the search engine may perform operations 102 to 104 of FIG. 1 after parsing the input. Additionally, the input box 501 may be configured to provide suggested topics as the user types or after the user has entered an input.

According to an exemplary embodiment of the inventive concept, instead of a single input box 501, the user interface 500 may include, for example, a first input box for selecting the category and a second input box for selecting the sub-category, as described above with reference to FIG. 1.

The search engine may determine the at least one second object and perform the search for cases that teach solutions for achieving the goal for the at least one second object (e.g., operations 102 and 103 of FIG. 1) and display the cases as a list on the user interface (e.g., operation 104 of FIG. 1).

In the example of FIG. 5, a plurality of cases 502 may be found from the search. The plurality of cases 502 includes Case 1, Case 2, and Case 3. Each case may include a plurality of second objects sharing a same attribute as the first object. Case 1 may include Object A, Case 2 may include Objects B and C, and Case 3 may include Object D. As an example, if the first object is the above-described motorboat, Object A may be an airplane, Object B may be an automobile, Object C may be a motorcycle, and Object D may be a submarine.

Each of the plurality of second objects in the plurality of cases 502 may have a plurality of parts. The plurality of cases 502 may discuss different solutions for each of the plurality of parts, e.g., reducing drag on the hull of a submarine. In the example of FIG. 5, Object A may includes Parts a to c, Object B may include Part d, Object C may include Part e, and Object D may include Parts f and g.

According to an exemplary embodiment of the inventive concept, alongside each of the plurality of second objects and/or the parts thereof, the solutions related to each may be summarized and displayed on the user interface 500. Alternatively, the solutions may be displayed on a separate screen of the user interface 500.

According to an exemplary embodiment of the inventive concept, the user may click on each of the plurality of cases 502 to see the full text of the case. Additionally, each of the objects and parts may be links (e.g., URLs). For example, the user may click on Part a of Object A in the user interface 500 to go to relevant portions of Case 1 related to Part a.

Furthermore, as described above, the search results may be ranked (e.g., operations described with reference to FIGS. 3A and 3B). In the example of FIG. 5, the plurality of cases 502 are assigned a plurality of ranks 503. The user may have the option to sort the plurality of cases 502 by rank. Additionally or alternatively, ranking may performed on the basis of the plurality of second objects. Thus, arrangement of the user interface 500 may be modified accordingly, e.g., the plurality of second objects may be listed first with corresponding cases alongside.

As one implementation example, referring to FIGS. 2, 3B, and 5, after viewing the list of cases, objects, and parts as well as their ranks, the user may select some of the parts of the cases deemed relevant for achieving the goal for the first object. The search engine, using cognitive technology, may combine the selected parts to form a plurality of combinations and present visualizations of the plurality of combinations (e.g., on another screen of the user interface 500).

The number of cases, objects, parts, and ranks illustrated in FIG. 5 is merely an example and the inventive concept is not limited thereto. The number may vary depending on results found for the selected topic that is entered into the search engine. Furthermore, the arrangement and appearance of the user interface 500 is merely exemplary and may be modified.

Figure 6:
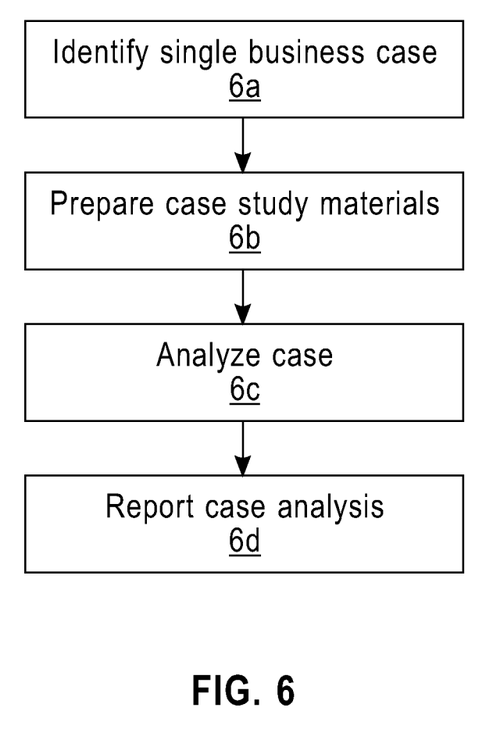
FIG. 6 is a flowchart illustrating a traditional case study method.
Figure 7:
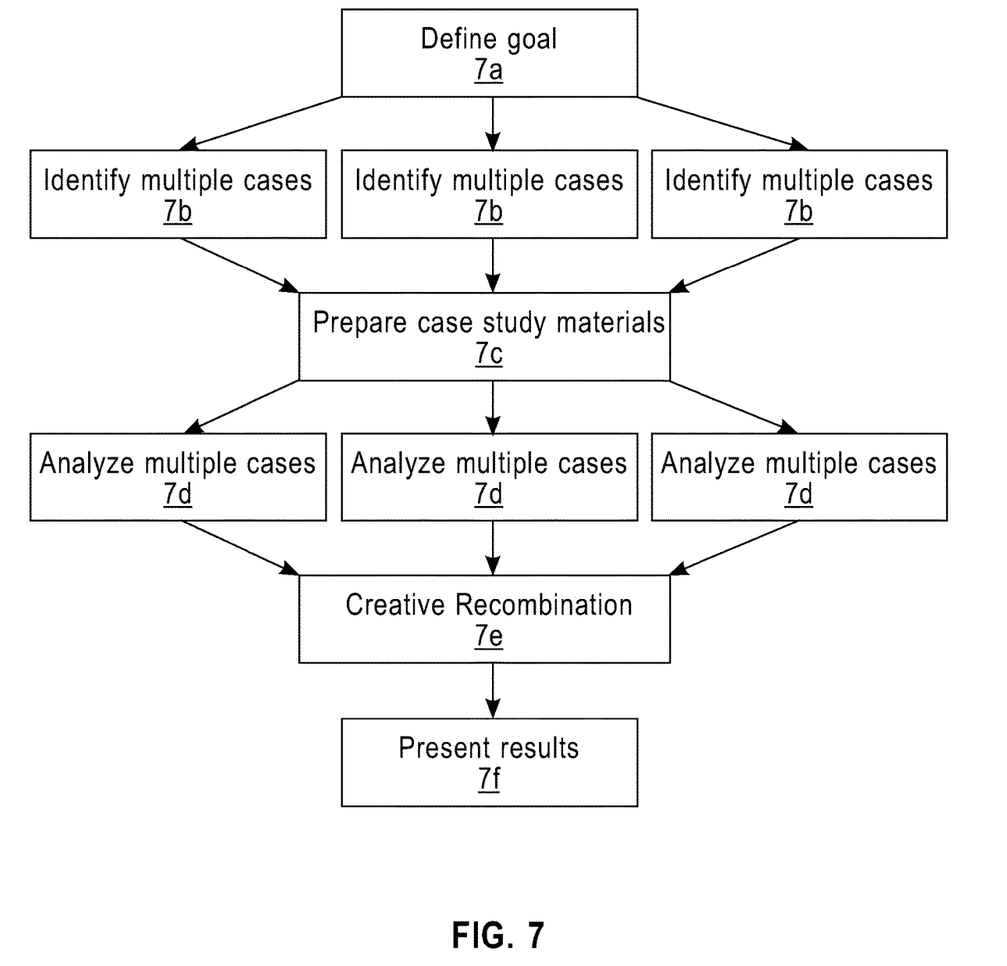
FIG. 7 is a flowchart illustrating an innovation-oriented case study method using a search engine according to an exemplary embodiment of the inventive concept.

FIG. 6 is a flowchart illustrating a traditional case study method. FIG. 7 is a flowchart illustrating an innovation-oriented case study method using a search engine according to an exemplary embodiment of the inventive concept.

Referring to FIG. 6, in a traditional case study method, an instructional designer or instructor may identify a single business case (step 6a). Case study materials may be prepared by the instructional designer based on this business case (step 6b). Alternatively, a learner may search for and identify a case and prepare the case study materials for self-study. Step 6a may be performed for a plurality of business cases and step 6b may be accordingly performed to prepare a plurality of case study materials.

A learner may analyze and study the case study materials for the single business case or the plurality of business cases (step 6c). As such, the learner may learn the reasons behind the success or failure of each business case. The learner may then report an analysis of the case(s) to the instructional designer (step 6d).

According to the traditional case study method, the knowledge and experience gained by learners may be limited. In other words, with the traditional case study method, learners may be restricted to analyzing directly relevant existing solutions. For example, only cases within the same industry or line of business may be selected, as the relation of other cases to the problem at hand may not be readily apparent. Learners are asked how a person or entity in a given business case solved a problem. As such, only one entity's solution is examined at a time, which may narrow the learner's "field of vision." Additionally, although learners may gather information from the business cases, they do not gain practical experience in developing innovative solutions.

Referring to FIG. 7, in the innovation-oriented case study method using the search engine according to an exemplary embodiment of the inventive concept, learners may be inspired to devise more innovative solutions to solve problems.

For example, in a training course, a goal or business problem may be defined (step 7a). The goal may correspond to the goal for the first object as described with reference to FIG. 1. The instructional designer or the learner may define the goal. For example, in initial phases of training, the instructional designer may define the goal to serve as a guide for learners, and eventually, the learners may define the goal themselves. As another example, instead of defining the goal, the instructional designer may select an area of focus and the learners may choose their own goals within the area of focus.

A diverse plurality of cases may be identified (step 7b). Here, the above-described search engine may used to find the plurality of cases (e.g., by selecting one of the list of topics) or the instructional designer may manually select the plurality of cases. The plurality of cases (e.g., the cases described with reference to FIG. 1) may originate from different industries, professions, or business units but address problems similar or related to the defined goal. The instructional designer or the search engine may identify "weak link" cases that may be from industries or contain implementations that are not directly related to the goal. In other words, some of the identified cases may only have a partial overlap with the goal. Solutions from these "weak link" cases may not be directly transferable or applicable to the goal (e.g., technological advances for a jet engine may not be directly applicable to an internal combustion engine).

Multiple case study materials may be prepared based on the diverse plurality of cases (step 7c). The case study materials may be tailored to emphasize or highlight certain aspects of the cases that may be useful for solving the goal. This may be more useful for new learners that may not yet appreciate the value of "weak link" solutions. For example, depending on the sophistication or level of the learners, the instructional designer may prepare pre-researched reading selections from the cases or may provide only URLs (e.g., the training material described with reference to FIG. 4) that the learners may have to peruse themselves to find useful information. To assist new learners, the similar elements between the case study materials and the goal may be identified in advance. According to an exemplary embodiment of the inventive concept, these case study materials are presented with the listed cases when using the search engine.

The various case study materials may be analyzed by the learners (step 7d). Learners may work together in teams to analyze the case study materials. The aim is for learners to separate out elements/parts from the case study materials that may be relevant or useful for solving the goal or at least parts of the goal. Learners may further use the search engine to assist in their analysis. For example, ranking may be performed as described with reference to FIGS. 3A and 3B, and the learners may use the ranking to assist them in finding relevant elements or parts.

Different solutions may be formulated by recombining different features or aspects from the various case study materials (step 7e). This step may encourage and foster innovative thinking to develop novel solutions. Not all solutions may be viable; however, learners may still gain valuable practical experience in devising innovative solutions from different sources. As described above, recombination may be performed using cognitive technology as provided by the search engine and the learners may then further adjust, modify, or add to the combinations as needed through the user interface of the search engine.

The different innovative solutions may be presented and evaluated (step 7f). For example, the solutions may be evaluated to determine a likelihood of success. Furthermore, different solutions developed by a group of learners may be compared and contrasted. Accordingly, ideas may be shared and each learner may further gain insights on novel and innovative ways to tackle a problem.

According to an exemplary embodiment of the inventive concept, steps 7a-7c are performed by the instructional designer(s) and steps 7d-7f are performed by the learner(s). However, the inventive concept is not limited thereto. For example, learners may perform all of steps 7a-7f by themselves for self-training. Additionally, some steps may be partially automated or assisted by a computer (e.g., with the search engine) as needed.

In the traditional case study method of FIG. 6, the goal or aim may be to discover how a business succeeded or failed in accomplishing something in the past. On the other hand, in the innovation-oriented case study method, by using the search engine according to exemplary embodiments of the inventive concept, the goal is to create or develop a new way of accomplishing something with a relatively high likelihood of success.

In particular, in the traditional case study method, learners do not have the opportunity to recombine different elements of different cases to attempt to discover innovative solutions. In the innovation-oriented case study method, by beginning with defining the business problem or goal, the learners may analyze a wide variety of cases to identify objects with similar attributes or parts, which might not have been found with the traditional case study. During this process, the learners are also gaining practical experience that is useful for real-world application.

By using the search engine according to exemplary embodiments of the inventive concept, learners may be exposed to multiple solutions at once when analyzing the diverse plurality of cases, rather than studying one case at a time. Additionally, the steps of the innovation-oriented case study method may be tailored to guide learners to develop their own methodology for coming up with innovative solutions. Furthermore, the thought experiments of this method allow learners to practice developing solutions, as compared to the more static learning style of the traditional case study method. As a result, learners may develop a broader understanding of the business problem or goal as well as repeatable and reusable skills in innovative and recombinant thinking to be used in addressing future problems.

Figure 8:
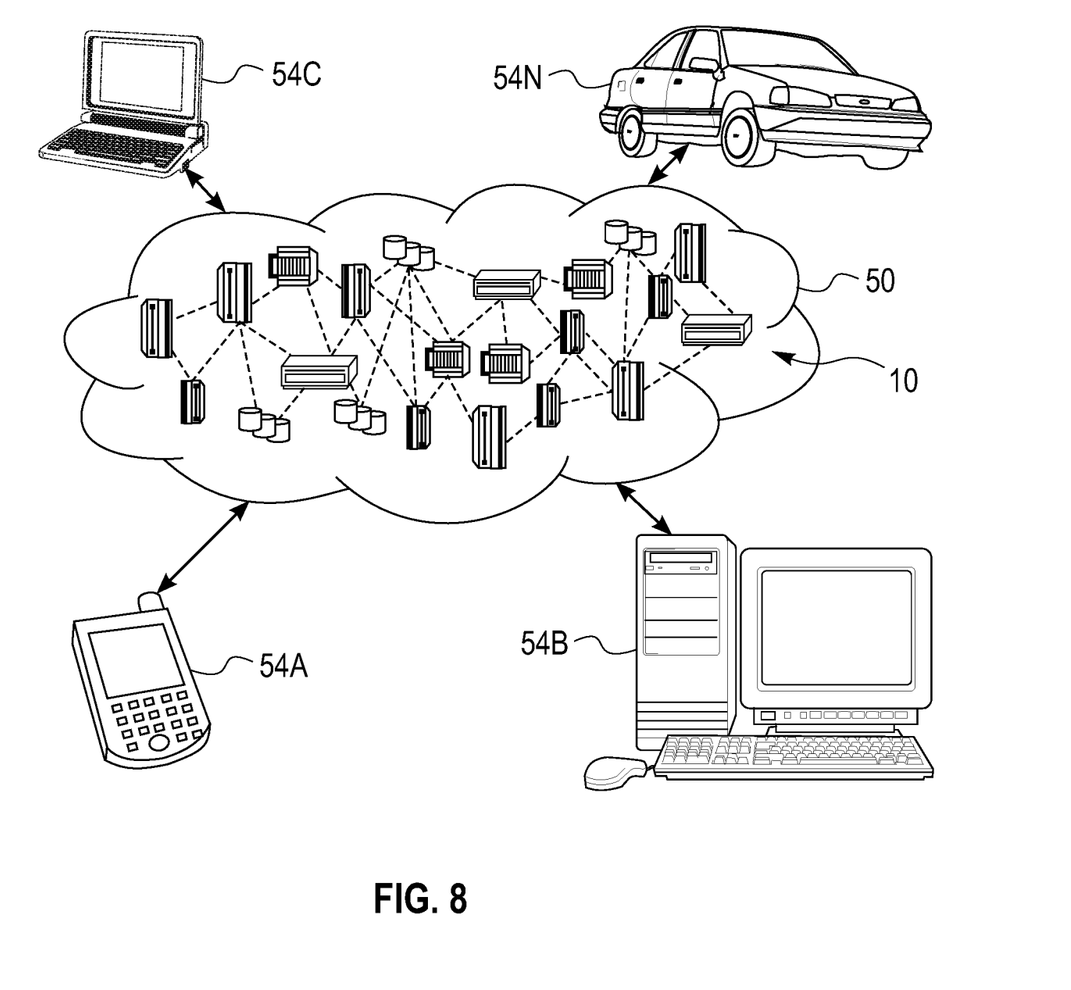
FIG. 8 depicts a cloud computing environment according to an exemplary embodiment of the inventive concept.
Figure 9:
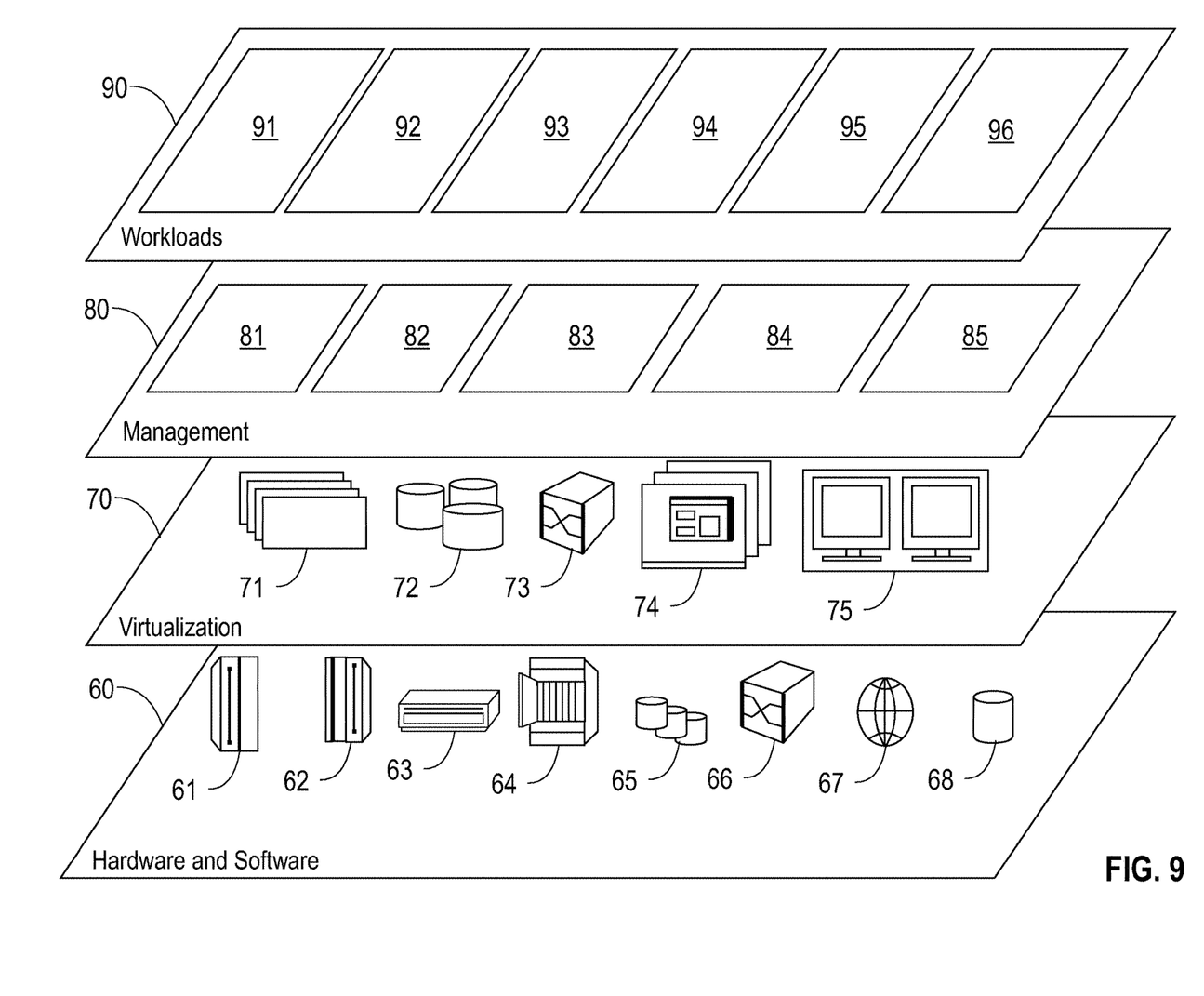
FIG. 9 depicts abstraction model layers according to an exemplary embodiment of the inventive concept.

FIG. 8 depicts a cloud computing environment according to an exemplary embodiment of the inventive concept. FIG. 9 depicts abstraction model layers according to an exemplary embodiment of the inventive concept.

It is understood in advance that although this disclosure includes a detailed description on cloud computing, implementation of the teachings recited herein are not limited to a cloud computing environment. Rather, embodiments of the inventive concept are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 8, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a mobile desktop 96.

With respect to the method, system, and computer program product described above with reference to FIGS. 1 to 5, they may be configured across the plurality of layers of FIG. 9 within the cloud computing environment 50 of FIG. 8. For example, the search engine may be configured at any of the hardware and software layer 60, the virtualization layer 70, the management layer 80, or the workloads layer 90.

Figure 10:
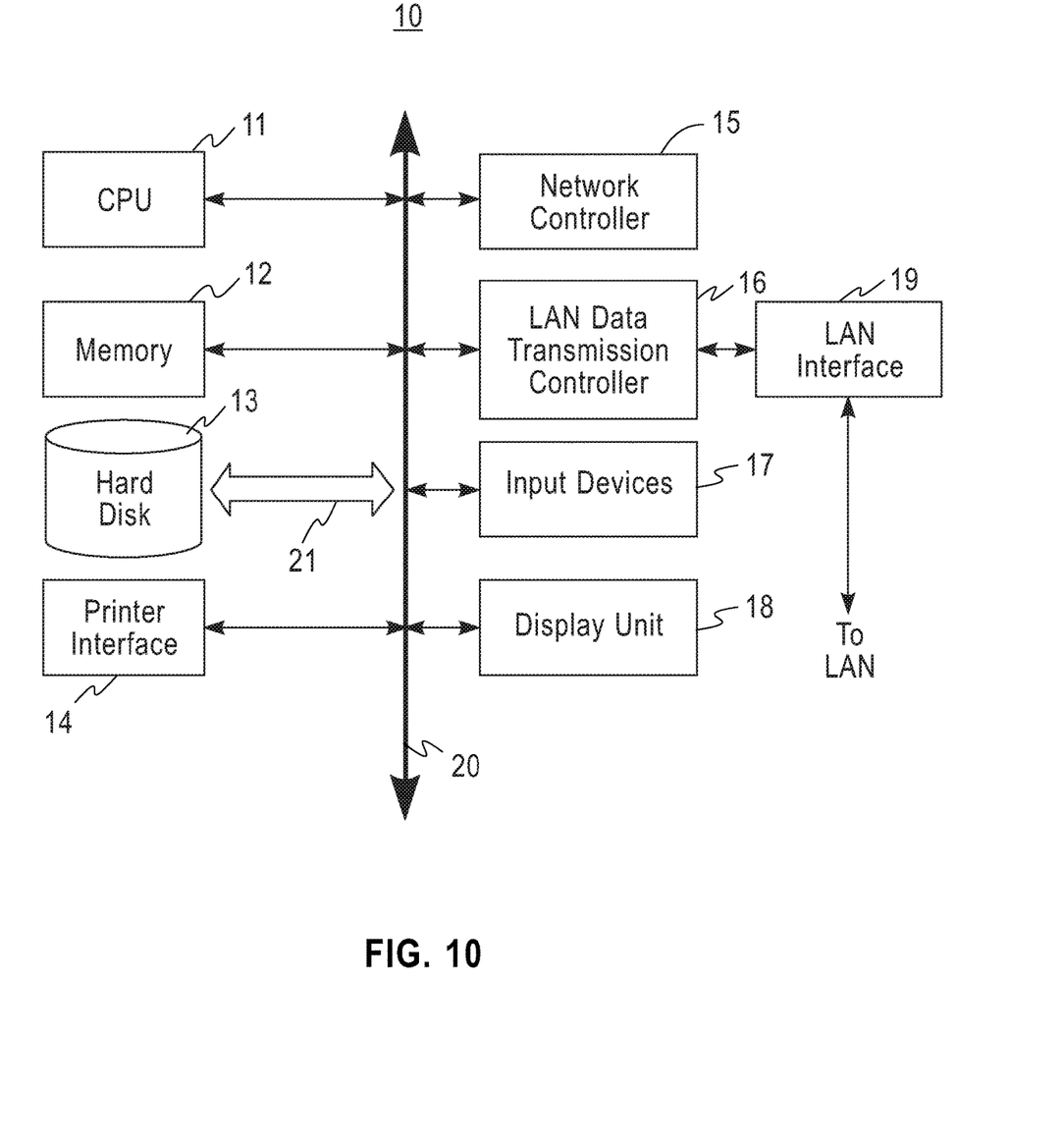
FIG. 10 illustrates an example of a computer system capable of implementing the methods according to exemplary embodiments of the inventive concept.

FIG. 10 illustrates an example of a computer system capable of implementing the methods according to exemplary embodiments of the inventive concept. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 10 may include, for example, a central processing unit (CPU) 11, random access memory (RAM) 12, a printer interface 14, a network controller 15, a local area network (LAN) data transmission controller 16, a display unit 18, a LAN interface 19, an internal bus 20, and one or more input devices 17, for example, a keyboard, mouse etc. As shown, the system 10 may be connected to a data storage device, for example, a hard disk, 13 via a link 21.

As an example, the system 10 of FIG. 10 may correspond to the search engine described above with reference to FIGS. 1 to 5 and/or be configured to perform the operations described above with reference to FIGS. 1 to 4. For example, the RAM 12 or hard disk 13 may be store the computer program configured to perform the above-described operations, the CPU 11 may execute the computer program, and the display unit 18 may display the user interface of the search engine. The network controller 15 (e.g., a network interface card) may enable the search engine to communicate with the Internet, e.g., to search for and retrieve cases.

Moreover, the inventive concept may be a system, a method, and/or a computer program product at any possible technical detail level of integration. The computer program product may include a computer readable storage medium (or media) having computer readable program instructions thereon for causing a processor to carry out aspects of the inventive concept.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the inventive concept may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the inventive concept.

Aspects of the inventive concept are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. See, e.g., FIGS. 1-4.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the inventive concept. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As described above, according to exemplary embodiments of the inventive concept, the method of searching for cases (or the search engine) may be used to train individuals to think innovatively. Cases may relate to any subject matter, and the method may be used by a single learner or a whole classroom. Learners are encouraged to investigate how different entities, which may not be entirely related to the goal at first glance, have solved problems in the past. Thus, not only may the goal be achieved or the business problem solved, learners also gain practice in innovative thinking. Accordingly, there may be a higher likelihood of future innovation after learners are trained while using the method of searching for cases according to exemplary embodiments of the inventive concept.

While the inventive concept has been shown and described with reference to exemplary embodiments thereof, it will be understood by those of ordinary skill in the art that various changes in form and detail may be made therein without departing from the spirit and scope of the inventive concept as defined by the following claims.

We claim:
1. A method of searching for cases comprising:
  presenting, by a computer, a list of topics for selection of one of the topics by a user, wherein a topic selected by the user relates to a first object and is associated with a goal of improving a first part of the first object;
  determining, by the computer, at least one second object that differs from the first object, the at least one second object including a second part different from the first part but provides a same function as the first part of the first object;

searching, by the computer, for cases that teach solutions for achieving a goal of improving the second part of the at least one second object; and presenting, by the computer, the cases to the user that resulted from the searching;

querying, by the computer, the user to select a subset of the cases the user deems to be most relevant to achieving the goal of improving the first part of the first object;

searching, by the computer, the Internet for components of the at least one second object that implements each solution among the selected subset of cases;

combining, by the computer, some of the components to form a visualization of a new object; and presenting the visualization to the user.

2. The method of claim 1, wherein the combining is performed randomly.

3. The method of claim 1, wherein the searching the Internet for components of the at least one second object is performed by an automated question answering computer capable of answering questions posed in natural language.

4. The method of claim 3, further comprising:
ranking, by the automated question answering computer, results of searching for components of the at least one second object,
wherein the combining is performed based on the results having a ranking exceeding a given threshold.

5. The method of claim 3, further comprising:
ranking, by the automated question answering computer, results of searching for components of the at least one second object; and
querying the user to select at least one of the results,
wherein the combining is performed based on the selected results.

6. The method of claim 1, further comprising
querying, by the computer, the user to select a subset of the cases the user deems to be most relevant to achieving the goal of improving the first part of the first object,
wherein the presenting is based on the selected subset of cases.

7. The method of claim 1, wherein the presenting includes presenting a uniform resource locator associated with at least one of the presented cases.

8. A search engine for searching for cases, the search engine comprising:
a memory configured to store a computer program;
a processor configured to execute the computer program; and
a display device,
wherein the computer program is configured to: present a list of topics on a user interface of the display device for selection of one of the topics by a user, wherein a topic selected by the user relates to a first object and is associated with a goal of improving a first part of the first object; determine at least one second object that differs from the first object, the at least one second object including a second part different from the first part but providing a same function as the first part of the first object; search for cases that teach solutions for achieving a goal of improving the second part of the at least one second object; and
present the cases on the user interface that resulted from the search, wherein the first and second objects are physical objects, and the same function is a physical attribute;
a network interface card configured to interface the computer program with the Internet, wherein the computer program is configured to query the user using the user interface to select a subset of the cases the user deems to be most relevant to achieving the goal of improving the first part of the first object, search the Internet for physical components of the at least one second object that implements each solution among the selected subset of cases, combine some of the physical components to form a visualization of a new object, and present the visualization on the user interface.

9. The search engine of claim 8, wherein the combining is performed randomly.

10. The search engine of claim 8, wherein the computer program performs the search by accessing an automated question answering computer that is capable of answering questions posed in natural language.

11. The search engine of claim 10, wherein the automated question answering computer ranks results of searching for physical components of the at east one second object and the combining is performed based on the results having a ranking exceeding a given threshold.

12. The search engine of claim 10, wherein the automated question answering computer ranks results of searching for physical components of the at least one second object, the computer program uses the user interface to query the user to select at least one of the results, and the combining is performed based on the selected results.

13. The search engine of claim 8, wherein the computer program queries the user using the user interface to select a subset of the cases the user deems to be most relevant to achieving the goal of improving the first part of the first object, and presents only the selected subset of cases.

14. The search engine of claim 8, wherein the computer program presents a uniform resource locator on the user interface associated with at least one of the presented cases.

15. A computer program product to search for cases, the computer program product comprising a computer readable storage medium having program instructions embodied therewith, the program instructions executable by a computer to perform a method comprising:
presenting a list of topics for selection of one of the topics by a user, wherein a topic selected by the user relates to a first physical object and is associated with a goal;
determining at least one second physical object that differs from the first physical object but provides a same function as the first physical object;
searching for cases that teach solutions for achieving the goal for the at least one second physical object;
presenting the cases to the user that resulted from the searching;
querying the user to select a subset of the cases the user deems to be most relevant to achieving the goal for the first physical object;
searching the Internet for physical components of the at least one second object that implements each solution among the selected subset of cases;
combining some of the physical components to form a visualization of a new physical object; and
presenting the visualization to the user.

16. The computer program product of claim 15, the method further comprising:
presenting the selected subset of cases to the user.

* * * * *